June 10, 1952  W. G. PROCTOR  2,600,264
GEOMETRICAL COMPUTER
Filed Feb. 27, 1945

*INVENTOR.*
WARREN G. PROCTOR

BY
*William D. Hall*
Attorney

Patented June 10, 1952

2,600,264

UNITED STATES PATENT OFFICE 2,600,264

GEOMETRICAL COMPUTER

Warren G. Proctor, Boston, Mass., assignor, by mesne assignments, to the United States of America as represented by the Secretary of War Application February 27, 1945, Serial No. 530,020

8 Claims. (Cl. 235—61)

The present invention relates in general to electrical apparatus and more specifically to electrical computing apparatus for the solution of triangles.

In many types of electrical apparatus used for range finding or gun directing, a method is desirable whereby triangles may be solved electrically. A special case of this problem is the solution of right triangles, and in particular the determination of the length of the hypotenuse of a right triangle, being given the lengths of the two sides.

A common method of electrically solving this problem is to provide two alternating current voltages, which are proportional respectively to the lengths of the two given sides of the triangle. One of these voltages is then shifted in phase by 90° and the two voltages are then applied to some type of summing device, the output of which is proportional to the peak amplitude of the vector sum of the two quadrature voltages, and hence proportional to the hypotenuse of the right triangle.

Former computers have employed two coils displaced 90° in space in some type of phase shifting device using rotating coils. One object of the present invention therefore is to produce this phase shift statically, thus conserving space and reducing the complexity of the phase shifting device.

One important problem in any type of phase shifting device is the elimination of frequency sensitivity. In other words, both the phase shift and the output amplitude of the device must be kept relatively independent of the frequency of the incoming alternating current wave. Since a complete 90° phase shift is extremely difficult to obtain, some method should also be provided to compensate for this incomplete phase shift since it introduces an error in the magnitude of the output of the summing device. Other objects of the present invention, therefore, are to provide means whereby both the phase shift and the gain of the phase shifting device will be kept constant, and means to compensate for the error introduced by incomplete phase shift.

In accordance with the present invention, there is provided a harmonic-free constant amplitude alternating current source, from which are taken two outputs proportional respectively to the lengths of the two known sides of the triangle. One of these voltages is fed to a phase shifter consisting of a differentiator and an integrator so connected that the combined gain of the two is relatively independent of variations in frequency of applied voltage and the output is shifted approximately 90° in phase with respect to the input. This output is fed through a push-pull arrangement to two detectors, while the other output from the alternating current source is fed to the same two detectors through a parallel arrangement. The output of these detectors is then combined in such a way that the resultant voltage is proportional to the arithmetic mean of the two detector input voltages. This latter arrangement compensates for incomplete phase shift, and the direct current voltage produced is then proportional to the length of the unknown side of the triangle being solved.

For a further understanding of this invention together with other objects and features thereof, reference is had to the following detailed description taken in connection with the accompanying drawings, in which.

Figure 1:
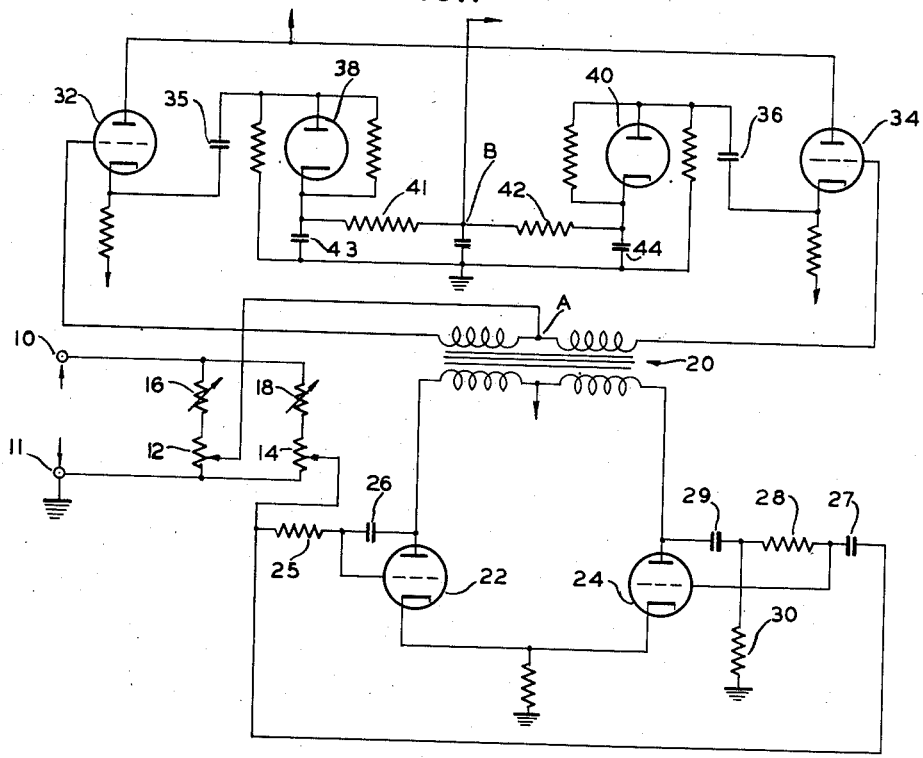
Fig. 1 is a schematic diagram of one form of the invention.

Referring now more particularly to Fig. 1 of the drawings, there is provided across terminals 10 and 11 a constant amplitude alternating current source, the output of which is free from harmonics of the fundamental frequency. This output is connected to two potentiometers, 12 and 14, each of which has in series with it a variable resistor, 16 and 18, respectively. The variable tap of potentiometer 12 is connected to the center tap A of the secondary of coupling transformer 20. The variable tap of potentiometer 14 is connected to the input circuits of the two phase shifting triodes, 22 and 24. The input circuit of triode 22 is an integrator composed of resistor 25 and capacitor 26, the latter being connected to the plate of triode 22 rather than to ground, thus introducing a certain amount of negative feedback into the stage.

The input circuit of triode 24 is a differentiator composed of capacitor 27 and resistor 28, the latter being coupled through capacitor 29 to the plate of triode 24, thus introducing negative feedback into this stage. Capacitor 29 is large enough to be a very low impedance to alternating current of the frequency used, and serves to block the D.-C. plate voltage of triode 24 from its grid. The plates of triodes 22 and 24 are connected respectively to the two ends of the primary of coupling transformer 20, the center tap of the primary being connected to the plate supply voltage. Resistor 30 serves as a grid leak for triode 24, thus preventing the grid of this triode from being in a "floating" condition.

The two ends of the secondary of coupling transformer 20 are connected respectively to the grids of triodes 32 and 34, which are connected as cathode followers. The outputs of triodes 32 and 34 are connected through coupling capacitors 35 and 36 to the plates of diode detectors 38 and 40, respectively. Averaging resistors 41 and 42 are so connected that the direct voltage present at point B is the arithmetic mean of the output voltages of the two diodes, which in turn are proportional respectively to the total inputs to the two cathode follower triodes.

When the circuit of Fig. 1 is in operation, the variable tap of potentiometer 12 is adjusted so that the voltage applied to the center tap of the secondary of transformer 20 is proportional to the length of one known side of the triangle to be solved. Because of the center tap arrangement this voltage is fed equally and in the same phase to the grids of the two cathode follower triodes 32 and 34.

Similarly, the variable tap of potentiometer 14 is adjusted so that the voltage applied to the input circuits of the phase shifting triodes 22 and 24 is proportional to the length of the other known side of the triangle to be solved. Because of the constants of the integrator input circuit consisting of resistor 25 and capacitor 26, the current through this circuit is substantially in phase with the applied voltage; however, the voltage across capacitor 26 is applied to the grid of triode 22, and this voltage lags the current in the circuit by 90°, and hence lags the applied voltage by approximately the same amount.

Similarly, the constants of the differentiator input circuit, consisting of capacitor 27 and resistor 28, cause the current through it to lead the applied voltage by approximately 90°. The voltage across the resistor 28 is applied to the grid of triode 24, and this voltage is in phase with the current, and hence leads the applied voltage by approximately 90°. Because of these phase shifts, the two triodes 22 and 24 are fed 180° out of phase with each other and hence operate push-pull, the two push-pull output voltages each being approximately 90° out of phase with the input voltage to the phase shift circuit, one leading and one lagging.

The phase shifting circuits are claimed in my divisional application, Serial No. 204,355, filed on November 17, 1950.

These push-pull voltages are fed through coupling transformer 20, so that they appear in push-pull on the grids of triodes 32 and 34. At the same time the voltage from the variable tap of potentiometer 12 is present on the grids of these triodes, and it is in quadrature with both of the push-pull voltages. The resultant voltage on each grid, therefore, is the vector sum of the two quadrature voltages, and hence proportional to the length of the hypotenuse of the triangle to be solved. Since triodes 32 and 34 are identical, their outputs, neglecting the effect of incomplete phase shift, will be equal. These outputs are fed to identical diode rectifiers 38 and 40, the outputs of which are respectively equal to the peak values of the inputs applied from triodes 32 and 34. The outputs of diodes 38 and 40 are combined through resistors 41 and 42 in such a manner that the voltage present at point B is equal to the arithmetic mean of the two diode outputs and again is proportional to the length of the hypotenuse of the triangle being solved.

By properly choosing the turns ratio of coupling transformer 20 and the gain of triodes 22 and 24, the constant of proportionality between the length of the one known side of the triangle and the magnitude of the push-pull voltage fed to the grids of triodes 32 and 34 can be made approximately equal to the constant of proportionality between the length of the other known side of the triangle and the magnitude of the voltage fed to the grids of the same two triodes through the center tap of the secondary of coupling transformer 20. Minor adjustments to make these constants more nearly equal can be made by varying the resistance of calibrating resistors 16 and 18.

It can be shown by circuit analysis that the gain of the integrator circuit including triode 22, resistor 25, and capacitor 26 is roughly inversely proportional to frequency, while the gain of the differentiator circuit including triode 24, capacitor 27, and resistor 28 is roughly directly proportional to frequency. As a result, the combined output of these triodes, which flows in the primary of transformer 20, is substantially independent of frequency variations of the input signal. It can further be shown that if we choose as a nominal frequency that frequency at which the theoretical gain of the integrator circuit and the differentiator circuit are equal, then variations of frequency of the order of ten per cent above and below this nominal frequency will cause variations in output of the order of only one-half per cent.

Figure 2:
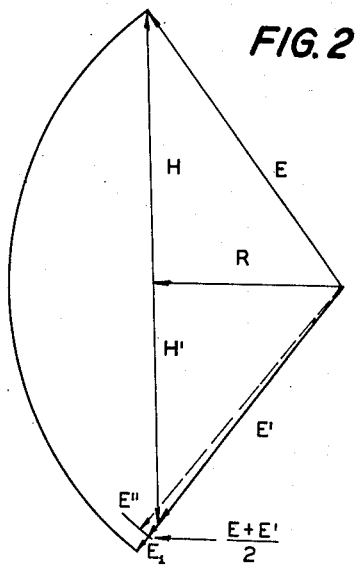
Fig. 2 is a vector diagram showing phase relationships of some of the voltages present in the apparatus.

Referring next to Fig. 2, we see a vector diagram of several of the voltages present in the circuit. Vector R represents the alternating voltage fed through the center tap of the secondary of transformer 20 to the grids of triodes 32 and 34. Vectors H and H' represent the push-pull voltages fed to the same grids. If the phase shift of the integrator and differentiator circuits were exactly 90°, H and H' would be perpendicular to R. However, the actual phase shift is always somewhat less than 90°, the actual amount varying with frequency. Therefore H and H' are shown not perpendicular to R, the amount of divergence from the perpendicular being exaggerated however for ease of illustration. Vectors E and E' are the resultant voltages present on the grids of triodes 32 and 34.

Since a cathode follower stage changes only the magnitude and not the phase of a voltage fed through it, these same vectors may represent the voltages fed to the two detector diodes 38 and 40. The output of these diodes depends not on the phase but only on the magnitude of the input to them, and therefore their D.-C. output magnitudes may be represented by the lengths of E' and E₁. The D.-C. output at point B as has been explained is the arithmetic mean of the detector outputs, and its magnitude is shown by $$\frac{E+E'}{2}$$

This can be seen to be approximately equal in magnitude to E'', which is what the D.-C. output at B would have been if the phase shift had been exactly 90°. The double detector therefore can be seen to compensate for errors introduced by incomplete phase shift.

While there has been described what is at present considered a preferred embodiment of the invention, it will be obvious to those skilled in the art that various changes and modifications may be made therein without departing from the invention, and that values of circuit constants given in the figures are illustrative only. It is aimed in the appended claims to cover all such changes as fall within the true scope of the invention.

What I claim to have invented is:

1. In an electrical apparatus for the solution of right triangles, means for supplying two alternating computing voltages having magnitudes proportional respectively to the lengths of the two known sides of the right triangle being solved; static phase shifting means, including an integrator circuit and a differentiator circuit, for producing from one of said computing voltages two push-pull voltages each differing in phase by 90° from the input voltage to said phase shifting means; means for coupling said one of said computing voltages to the input of said phase shifting means; at least two detecting means; means for simultaneously coupling each of said push-pull voltages and the other of said computing voltages to the input of a different one of said detecting means; and means associated with said detecting means for producing a D.-C. output which is equal in magnitude to the arithmetic mean of the outputs of said detecting means, and which is proportional in magnitude to the length of the hypotenuse of the right triangle being solved.

2. In an electrical apparatus for the solution of right triangles, means for supplying two alternating voltages having magnitudes proportional respectively to the lengths of two known sides of a triangle, means for producing two push-pull voltages each 90° out of phase with one of said alternating voltages, means for combining the other of said alternating voltages with said push-pull voltages to produce two resultant voltages, at least two detector means, means for feeding said resultant voltages to said detector means, resistor means connected to the output of said detector means, and an output means connected at an intermediate point on said resistor means.

3. In an electrical apparatus for the solution of right triangles, means for providing two alternating voltages substantially in phase, having magnitudes proportional respectively to two sides of the triangle, static means, including an integrator circuit and a differentiator circuit, for shifting the phase of one of said alternating voltages approximately 90° with respect to the other alternating voltage, a summing means the output of which is proportional to the hypotenuse of the triangle, and means for feeding both of said voltages to said summing means.

4. In combination an integrator circuit and a differentiator circuit having a common input and a common push-pull output, two detectors fed by said push-pull output, and having an additional input and a common output.

5. In an electrical apparatus for the solution of right triangles, means for supplying two alternating voltages, one of said voltages having a magnitude proportional to the length of one known leg of a triangle, the other of said voltages having a pair of components in push-pull relationship, each of said components proportional to the length of a second known leg of said triangle and having a 90° phase relation to said first alternating voltage, means for combining said first alternating voltage with each of said push-pull voltage components to produce two resultant voltages and means to determine the average magnitude of said two resultant voltages.

6. An electrical apparatus for the solution of right triangles, comprising means for providing two alternating voltages substantially in phase, having magnitudes proportional respectively to two sides of the triangle, a static phase shifter for shifting the phase of one of said alternating voltages of approximately 90° with respect to the other alternating voltage connected to be supplied from said providing means, said phase shifter including means therein for translating voltages respectively directly proportional and inversely proportional to frequency to render said phase shifter independent of variation in frequency, a summing means the output of which is proportional to the hypotenuse of the triangle, and means for feeding both of said voltages to said summing means, said feeding means comprising connections respectively from said providing means and said phase shifter to said summing means.

7. An electrical apparatus for the solution of right triangles, comprising means for providing two alternating voltages substantially in phase, having magnitudes proportional respectively to two sides of the triangle, a static phase shifter for shifting the phase of one of said alternating voltages of approximately 90° with respect to the other alternating voltage connected to be supplied from said providing means, said phase shifter including means therein for rendering the phase shift produced by said phase shifter independent of variation in frequency, a summing means the output of which is proportional to the hypotenuse of the triangle, and means for feeding both of said voltages to said summing means, said feeding means comprising connections respectively from said providing means and said phase shifter to said summing means.

8. An apparatus according to claim 7, wherein said summing means includes means for providing an output which is proportional to the arithmetic mean of the input voltages applied to said summing means.

WARREN G. PROCTOR.

REFERENCES CITED

The following references are of record in the file of this patent:

UNITED STATES PATENTS

| Number | Name | Date |
|---|---|---|
| 2,004,613 | Meacham | June 11, 1935 |
| 2,225,348 | Mikelson | Dec. 17, 1940 |
| 2,250,461 | Batchhelder | July 29, 1941 |
| 2,256,538 | Alford | Sept. 23, 1941 |
| 2,279,506 | Reid | Apr. 14, 1942 |
| 2,282,105 | Tunick | May 5, 1942 |
| 2,375,227 | Hillman | May 8, 1945 |
| 2,382,994 | Holden | Aug. 21, 1945 |
| 2,385,334 | Davey | Sept. 25, 1945 |
| 2,439,381 | Darlington | Apr. 13, 1948 |
| 2,447,517 | Manson | Aug. 24, 1948 |
| 2,465,624 | Agins | Mar. 29, 1949 |